(12) United States Patent
Ischebeck et al.

(10) Patent No.: US 9,605,780 B2
(45) Date of Patent: Mar. 28, 2017

(54) COUPLING, IN PARTICULAR FOR CONNECTING ANCHOR RODS

(71) Applicant: Friedr. Ischebeck GmbH, Ennepetal (DE)

(72) Inventors: Ernst Friedrich Ischebeck, Ennepetal (DE); Ferdinand Coerschulte, Sundern (DE)

(73) Assignee: Friedr. Ishebeck GmbH, Ennepetal (DE)

( * ) Notice: Subject to any disclaimer, the term of this patent is extended or adjusted under 35 U.S.C. 154(b) by 760 days.

(21) Appl. No.: 13/908,639

(22) Filed: Jun. 3, 2013

(65) Prior Publication Data

US 2013/0264819 A1 Oct. 10, 2013

Related U.S. Application Data

(63) Continuation of application No. PCT/EP2011/071501, filed on Dec. 1, 2011.

(30) Foreign Application Priority Data

Dec. 3, 2010 (DE) ........................ 10 2010 061 006

(51) Int. Cl.
*F16L 15/00* (2006.01)
*E02D 5/80* (2006.01)
*E21B 17/042* (2006.01)

(52) U.S. Cl.
CPC ............ *F16L 15/003* (2013.01); *E02D 5/808* (2013.01); *E21B 17/0426* (2013.01)

(58) Field of Classification Search
CPC ................................................... F16L 15/009

(Continued)

(56) References Cited

U.S. PATENT DOCUMENTS

| | | |
|---|---|---|
| 1,817,776 A | 8/1931 | Sipe |
| 1,952,996 A | 3/1934 | Landgraf |

(Continued)

FOREIGN PATENT DOCUMENTS

| | | |
|---|---|---|
| AT | 241362 B | 7/1965 |
| AT | 366777 B | 5/1982 |

(Continued)

OTHER PUBLICATIONS

International Search Report, Application No. PCT/EP2011/071501, Completed: May 11, 2012; Mailing Date: May 21, 2012, 2 pages.

(Continued)

*Primary Examiner* — David E Sosnowski
*Assistant Examiner* — James Linford
(74) *Attorney, Agent, or Firm* — Whitmyer IP Group LLC (57) ABSTRACT

A coupling for support members includes a sleeve-like coupling sleeve having screw-in openings that proceed from two opposite sides and are each provided with an internal thread. A radially inwardly directed mounting protrusion is formed between the two internal threads in the screw-in openings on the inner side of the coupling sleeve. A radial recess is formed in each case between the mounting protrusion and the internal threads, the recess adjoining a runout of the adjacent internal thread. An elastically deformable sealing ring is inserted in each case into the two recesses. In the unloaded state of the sealing rings, the outside diameter thereof is greater than the inside diameter of the mounting protrusion and/or greater than the core diameter of the internal thread. The coupling has a clamping ring, the outside diameter of which is smaller than or the same as the inside diameter of the mounting protrusion.

19 Claims, 9 Drawing Sheets

(58) Field of Classification Search
USPC .......................................................... 277/614
See application file for complete search history.

(56) References Cited

U.S. PATENT DOCUMENTS

| | | | |
|---|---|---|---|
| 2,818,292 A | | 12/1957 | Graber |
| 2,915,322 A | * | 12/1959 | Dunlop ................ F16L 15/003 285/10 |
| 3,472,533 A | * | 10/1969 | Turner ................ F16L 15/003 285/258 |
| 3,537,738 A | | 11/1970 | Fischer et al. |
| 4,362,419 A | | 12/1982 | Duncan |
| 4,362,440 A | | 12/1982 | Glaesmann et al. |
| 4,537,406 A | * | 8/1985 | Hirasuna ............. E21B 17/0423 277/314 |
| 4,568,113 A | | 2/1986 | Axford et al. |
| 4,588,213 A | | 5/1986 | Bollfrass et al. |
| 4,616,537 A | * | 10/1986 | Axford ................ E21B 17/042 470/176 |
| 4,679,831 A | | 7/1987 | Kielminski |
| 4,770,448 A | | 9/1988 | Strickland et al. |
| 4,835,873 A | | 6/1989 | Weems |
| 4,875,713 A | | 10/1989 | Carstensen |
| 4,955,645 A | | 9/1990 | Weems |
| 4,988,127 A | * | 1/1991 | Cartensen ............. E21B 17/042 285/334 |
| 2002/0076273 A1 | | 6/2002 | Carstensen |
| 2003/0025328 A1 | * | 2/2003 | Schenk ................ F16L 15/003 285/334 |
| 2005/0248154 A1 | | 11/2005 | Huston |

FOREIGN PATENT DOCUMENTS

| | | |
|---|---|---|
| DE | 568114 C | 1/1933 |
| DE | 600537 C | 7/1934 |
| DE | 1784616 A1 | 8/1971 |
| DE | 2240935 A1 | 2/1974 |
| DE | 3230777 A1 | 3/1983 |
| DE | 3315229 A1 | 11/1983 |
| DE | 3411519 A1 | 10/1984 |
| DE | 3400182 A1 | 7/1985 |
| DE | 3717024 A1 | 12/1988 |
| DE | 3828335 C1 | 11/1989 |
| DE | 3910627 A1 | 10/1990 |
| DE | 3927436 A1 | 10/1990 |
| DE | 4116771 A1 | 11/1992 |
| DE | 4220636 A1 | 1/1994 |
| DE | 4230636 A1 | 3/1994 |
| DE | 9218985 U1 | 10/1996 |
| DE | 6990492 T2 | 12/2002 |
| DE | 10225980 A1 | 12/2003 |
| DE | 102005022585 A1 | 3/2006 |
| DE | 102005010503 B3 | 6/2006 |
| DE | 102005015494 A1 | 10/2006 |
| DE | 60118555 T2 | 3/2007 |
| DE | 60120450 T2 | 5/2007 |
| DE | 102010016484 A1 | 2/2011 |
| EP | 0131956 A1 | 1/1985 |
| EP | 0391119 A1 | 10/1990 |
| EP | 0878584 A1 | 11/1998 |
| EP | 1056968 B1 | 4/2006 |
| GB | 2477845 A | 8/2011 |
| WO | 2005047650 A1 | 5/2005 |
| WO | 2008019409 A1 | 2/2008 |
| WO | 2008104083 A1 | 9/2008 |
| WO | 2011020696 A2 | 2/2011 |

OTHER PUBLICATIONS

German Search Report, Application No. 10 2010 061 006.2, Dated: Aug. 28, 2015; Received: Jan. 3, 2016, 4 pages.

* cited by examiner

COUPLING, IN PARTICULAR FOR CONNECTING ANCHOR RODS

FIELD OF THE INVENTION

The present invention relates to a coupling for connecting support members provided with external threads, preferably for connecting anchor rods of injection drilling anchors for rotary-percussive drilling, the coupling comprising a sleeve-like coupling sleeve having two screw-in openings that extend from two opposite ends and are each provided with an internal thread for screwing in support members, a radially inwardly facing mounting protrusion that preferably extends annularly along the entire periphery being formed between the two internal threads of the screw-in openings on the inner side of the coupling sleeve, a radial recess that is rotationally symmetrical with regard to the geometrical longitudinal center axis of the coupling sleeve being formed in each case between the mounting protrusion and the internal threads, said recess adjoining a preferably conical run-out of the adjacent internal thread or intersecting the internal thread, an elastically deformable sealing ring preferably made of plastics being inserted or insertable in each case into the two recesses, and in an unloaded and/or undeformed state of the sealing ring, the outside diameter thereof being larger than the inside diameter of the mounting protrusion and/or larger than or equal to the core diameter of the internal thread.

BACKGROUND OF THE INVENTION

In the prior art, injection drilling anchors are known from DE 34 00 182 C that can comprise a plurality of anchor rods connected by means of coupling nuts for achieving greater anchor lengths. With regard to known injection drilling anchors, reference is also made to DE 38 28 335 C1. Depending on the desired use, one speaks of injection drilling anchors, injection piles, micro piles, soil nails or rock anchors. For connecting individual anchor rods provided with an external thread (in many cases a continuous thread), different coupling sleeves or coupling nuts provided with a matching internal thread are known in the prior art. In the case of a simple construction, a central threadless portion is provided in the coupling sleeve, which prevents the anchor rods from being screwed through the coupling sleeve. The disadvantage of this is that the end of the thread at the center stop can be produced only with a conical run-out or with an undercut. In either case this has disadvantages for the rotary-percussive drilling of the injection drilling anchor that is desired in many applications, and also for a desired later backlash-free load transmission of alternating compressive and tensile forces. In the case of the rotary-percussive drilling of injection drilling anchors, in first instance, a drill bit is secured on a longitudinal end of an anchor rod (e.g., screwed on), it being optionally possible that for extension purposes, one or a plurality of anchor rods is/are already connected to the opposite longitudinal end by means of coupling nuts. A drive acts on the longitudinal end opposite to the drill bit, and the drive, in addition to a torque, also exerts percussive blows which act in a pulsating manner in the longitudinal and/or axial direction so as to facilitate penetrating through solid layers, for example in the bedrock. Depending on the number of anchor rods and the embodiment of the couplings, there is a risk that a portion of the impact energy gets lost between the drive and the drill bit. In a further known embodiment, the coupling sleeve has in its interior two thread ends that are offset with respect to one another by half a turn whereby, however, screwing-through of anchor rods can be prevented only up to a limited screw-in torque, and wherein here as well, the compression and impact transmission in the coupling sleeve via only the thread is perceived as being disadvantageous. Also, attempts have already been made to weld an inner stop for the anchor rods into the coupling sleeves or, for example, to insert for this purpose a spring pin into the thread. However, a limited compression transmission and an undesirable notch effect are again perceived as a disadvantage. A coupling sleeve provided with an internal thread for anchor rods of self-drilling injection anchors is also known from EP 0 391 119 B1. For cost-effective manufacturability it is provided that the cylindrical base area of the internal thread is followed by a conically extending base area on which the internal thread continues. Finally, from DE 42 20 636 B4, a coupling sleeve of the aforementioned kind is known, wherein for achieving a reliable tightness, it is proposed that an axial end stop for an end face of a screwed-in injection anchor rod is formed in the coupling sleeve, that a separate sealing element in the form of an O-ring that leaves a central opening is accommodated upstream of this end stop, that the sealing element is disposed in a circumferential radial recess that intersects the course of the thread, and that the recess in terms of its depth corresponds approximately to the depth of the thread root of the internal thread. Although this connecting element has advantages over the previously mentioned coupling nuts with regard to the tightness, there appears to be the limitation that the O-rings are located in the flow of forces and, in particular in the case of axial alternating load, can result in slip, leading to power loss.

SUMMARY OF THE INVENTION

Against this background it is an object of the present invention to improve a coupling of the aforementioned kind in an advantageous manner so that in particular the aforementioned limitations can be avoided as far as possible. In particular, the improvement according to the invention should permit, in addition to a good sealing effect, a transmission of axial impact energy with as few losses as possible, and should consist of components that can be produced and assembled in a manner as simple as possible and that are as inexpensive as possible.

The object is achieved according to the invention first and foremost in conjunction with the features that the coupling has a clamping ring that is preferably made of metal and that has an outside diameter that is smaller than or equal to the inside diameter of the mounting protrusion, and that each of the sealing rings has a rotationally symmetrical abutment surface that, for abutment against one of the two lateral surfaces of the clamping ring, extends in a radius interval that partially geometrically overlaps a radius interval of the lateral surfaces of the clamping ring when the sealing rings are concentrically aligned with the clamping ring. Since the mounting protrusion, the clamping ring and the sealing rings each leave a central hollow cross-section, a continuous cavity is created in the coupling between the hollow center channels of two support members and/or anchor rods coupled by means of the coupling. When screwing the anchor rods into the coupling, they can be brought in direct front-end abutment against the clamping ring and thus can be firmly tightened against one another from two opposite sides by means of the clamping ring, with the clamping ring being clamped in a sandwich-like manner between the two end faces of the anchor rods. The clamping ring is advantageously made from a material that is comparatively (e.g., in comparison with plastics) difficult to deform, preferably from metal and more preferably from steel. Since the end faces of the anchor rods that are likewise advantageously made from steel are directly braced against the clamping ring, a particularly rigid connection of the two anchor rods can be achieved in the direction of the geometrical longitudinal center axis of the coupling, i.e. in the axial direction, for forces, in particular shock or impact forces, acting in this direction. If such a coupling arrangement is used for an injection drilling anchor, during the rotary-percussive introduction of the injection drilling anchor into the bedrock, this allows the impacts, or the impact energy thereof, generated by the drill drive for facilitating the advance, to be directly transmitted from an anchor rod to the clamping ring, and from there directly to the adjacent anchor rod, i.e., without flow of compressive forces through the coupling sleeve being necessary. The clamping ring thus enables an axially rigid support of both support members so that it is also possible to assemble a large number of support members or anchor rods by means of a corresponding plurality of couplings according to the invention so as to form as a whole an axially rigid injection drilling anchor. In addition to a resulting low-loss transmission of impact energy, the coupling according to the invention also offers advantages regarding the sealing effect as well as simple manufacturability and mountability, the sealing rings being able to fulfill a double function. Since the sealing rings consist of an elastic material, preferably a plastics such as, e.g., polyamide, that is easier to deform compared to the clamping ring, and since in the course of the screwing-in of the anchor rods, the sealing rings are pressed at the sealing zones against surfaces of the coupling sleeve and the clamping ring, as a consequence of a gapless coming together along the periphery, the result is a reliable sealing function. In addition, the sealing rings have the function of facilitating assembly. For this purpose it is preferred that in the unloaded state of the sealing ring, the outside diameter thereof is larger than the inside diameter of the mounting protrusion and larger than the core diameter of the internal thread. However, the two sealing rings are advantageously elastic enough that they can be pressed with the fingers into an oval shape and can be inserted in this manner into the coupling sleeve, where they can be pivoted into the run-out of the thread and clipped into the respective recess.

According to the described diameter relationships, each sealing ring is positively held on both sides in the longitudinal or axial direction between the mounting protrusion and the adjacent internal thread. For preassembling, i.e., for preparing the coupling for screwing into the anchor rods, it can be advantageous to proceed in such a manner that in a first instance only one of the two sealing rings is inserted in the described manner into a recess, that subsequently the clamping ring is inserted through the opposite screw-in opening into the coupling sleeve so that the clamping ring is located in the region of the hollow cross-section spanned by the mounting protrusion, and that subsequently the second sealing ring is inserted in the above-described manner into the recess associated with the second sealing ring. However, this order is not necessary. Also, if the outside diameter of the clamping ring, as preferred, is slightly smaller than the inside diameter of the mounting protrusion, i.e., if the clamping ring can be fitted with lateral clearance for movement in or through the mounting protrusion, then, due to the interaction between the two sealing rings, the clamping ring is already held captive axially in the preassembled state of the coupling, so that the coupling can be easily and reliably assembled on the construction site. Depending on the selected and more detailed configuration and the dimensions of the recesses and the adjoining run-out of the thread, a certain axial movability of the sealing rings and the clamping ring relative to the coupling sleeve can advantageously remain prior to screwing in the support members. In the described preferred embodiment there is nonetheless already an axial captive hold of the clamping ring in the coupling sleeve. The hold can even be configured such that under certain circumstances, the clamping ring can be removed again from the coupling sleeve only by means of a special tool. If during preassembly a limited axial clearance for movement remains, i.e., if in the preassembled state an axial end stop fixed in a particular position is still absent, the clamping sleeve and/or the axial end stop adjusts as needed to the adjoining anchor rods only during screwing in of the anchor rods and, as explained later, possibly even when introducing the injection drilling anchor into the bedrock; however, the desired axial impact stiffness is maintained at all times. Since the clamping ring, when concentrically aligned, is held in its position only by the two opposing, elastically deformable sealing rings, i.e., does not come into direct contact with the stiff coupling sleeve, a certain movability of the clamping ring relative to the coupling sleeve, which is determined by the deformability of the sealing rings, still remains even after the anchor rods are screwed in. It has now been surprisingly found that in particular the variable inclination of the clamping ring relative to a reference plane perpendicular to the geometrical longitudinal center axis which may also possibly result can be of great advantage when introducing injection drilling anchors. If an injection drilling anchor strikes against a hard obstacle during drilling, a certain lateral deflection can occur and, as a result, a possibly time-variable slight tilting of the anchor rod ends in the coupling sleeve can occur, which is possibly also dependent on the clearance existing in the thread. The two sealing rings that form an elastic bearing for the clamping ring, in a manner of speaking, at the same time permit limited position changes, in particular inclination changes, of the clamping ring within the coupling sleeve, so that the clamping ring, by establishing in each case the largest possible contact or load transmission surfaces, can align itself of its own accord with the front ends of the anchor rods-. Even under the described difficult circumstances, the coupling according to the invention and/or the coupling arrangement formed with the anchor rods thus maintains high impact stiffness. Alternatively, depending on the desired application, such a limited flexibility of the coupling connection can be avoided by implementing the inner surface of the mounting protrusion and the outer surface of the clamping ring cylindrically and with equal diameters. Preferably, it is provided that the depth and the outside diameter of the recesses correspond approximately to the depth of the thread and the outside diameter of the internal thread, respectively. The width of the clamping ring is advantageously selected such that the clamping ring extends in the direction of the geometrical longitudinal center axis up to an axial overlap with the two internal threads, or at least with their run-outs. With regard to the preceding embodiments, it is preferred that the clamping ring is made as a separate component from the coupling sleeve. As described, the clamping ring can then be inserted loosely into the hollow cross-section of the mounting protrusion and captively held by means of the sealing rings. Alternatively, it is conceivable that the clamping ring is secured at the mounting protrusion, for example, pressed in or welded therein. In this respect it is even conceivable to alternatively fabricate the clamping ring integrally with the coupling sleeve.

There are numerous further possibilities for preferred refinements. It is preferably provided that said recesses directly adjoin the mounting protrusion. There is the possibility that in the unloaded and/or undeformed state, the sealing rings inserted in each case in one recess are positively held along their entire periphery or at least in certain peripheral regions in the recess without, or with only little, clearance for movement in a direction parallel to the geometrical longitudinal center axis. Such an axial clearance for movement can be, for example, in the range of only a few fractions of a millimeter, for example in the range of several tenths or only hundredths of a millimeter. It is preferred that the sealing rings each have a radially inner ring portion that is bordered on one of its sides by the abutment surface for the clamping ring. It is regarded as suitable that at least in the radial overlapping interval, the abutment surface of the sealing ring and the lateral surface of the clamping ring have shapes that are matched to one another for achieving a face-to-face surface support and that are in particular conical and/or rounded in profile cross-section, at least in certain regions. In addition to a self-centering effect during the assembly, a conical and/or rounded shape can facilitate the already described possible pivotability of the clamping ring relative to a reference plane spanned by the mounting protrusion. Furthermore, it is preferred that the sealing rings each have a radially outer ring portion that is connected to the inner ring portion and that is bordered by a cylindrical or substantially cylindrical inner surface that transitions into the abutment surface in an inclined or rounded manner. Said inner surface can adjoin an end lateral surface of the outer ring portion for support on an end lateral surface of the mounting protrusion, the lateral surfaces of the outer ring portion and of the mounting protrusion having shapes that are matched to one another for achieving a planar surface support and preferably extend in the radial direction transversely or perpendicularly with respect to the geometrical longitudinal center axis. There is the possibility that on the outer ring portion, the end lateral surface transitions, in particular in a rounded manner, into an outer surface, the outer surface of the outer ring portion, and preferably the curvature which adjoins the outer surface, as well as the circumferential surface of the recess, which surface adjoins the lateral surface of the mounting protrusion, having shapes that are matched to one another for achieving a continuous face-to-face surface support. The outer surface on the outer ring portion can transition into a back surface inclined thereto, wherein in a cross-section oriented transversely with respect to the circumferential direction, the back surface can be inclined more sharply relative to the geometrical longitudinal center line of the coupling than the conical run-out of the internal thread. Preferably, a configuration can be selected according to which in a preassembled state of the coupling in which the two sealing rings are inserted into the recesses and the clamping ring is situated between the two sealing rings, the sealing rings are substantially flush with the lateral surfaces of the clamping ring in the direction of the geometrical longitudinal center axis, or protrude outwardly beyond the lateral surfaces of the clamping ring. This is particularly preferred when using a clamping ring in which the opposing end lateral surfaces extend conically and/or with a convex curvature in a radially outer ring surface region, and in a ring surface region radially inward thereof, extend perpendicularly with respect to the geometrical longitudinal center axis and plane-parallel to one another, and in which the radially outer ring surface region transitions in a rounded manner into the radially inner ring surface region. This is particularly advantageous in connection with the use of anchor rods, the end faces of which have a radially inner planar end face region, and radially outward thereof, an end face region that, in the longitudinal direction of the anchor rod, protrudes beyond the inner end face region to an increasing extent in the radially outward direction (at least within a radius interval). Screwing in such an anchor rod advantageously results in axial compression and radial expansion of the elastic sealing ring, so that due to the lateral expansion on the outside of the sealing ring, the sealing ring profile is pressed into the hollow cross-section of the recess, corresponding to the contour, and fills same, thereby generating a particularly reliable sealing effect. Preferably, the inside diameter of the mounting protrusion can be slightly smaller than or equal to the core diameter of the internal thread. Also, it is preferred that the outside diameter of the preferably cylindrical outer surface of the clamping ring is slightly smaller than the diameter of the inner surface of the inner ring portion of the sealing ring, which facilitates a possible inclination of the sealing ring. It is also preferred that the outer ring surface region of the lateral surface of the clamping ring extends radially inwardly beyond the abutment surface of the inner ring portion of the sealing ring.

The invention further comprises a coupling arrangement which includes at least one coupling that exhibits one or more of the above-described features. It is provided here that in each case one anchor rod for injection drilling anchors which has a continuous center channel and is preferably provided with a continuous external thread in the longitudinal direction, is screwed into the coupling sleeve from both ends until the end face of the anchor rod is supported on and preferably braced against the respective opposing lateral surface of the clamping ring. It is preferred here that the end face of the anchor rod has a radially inner, planar end face region, and radially outward thereof, an end face region that, in the longitudinal direction of the anchor rod, protrudes beyond the inner planar end face region to an increasing extent in the radially outward direction, and that the radially outer end face region of the anchor rod and the radially outer ring surface region of the clamping ring have shapes that are conical and/or curved in profile cross-section and are matched to one another for achieving, at least in a limited radius interval, a face-to-face surface support. In this respect, one could refer to a preferably overall convex contour of the ends of the clamping ring. The appropriately matching shapes enable a particularly large achievable contact surface for transmitting the impact energy during rotary-percussive drilling of the injection drilling anchor. Moreover, shapes that are matched to one another in such a manner facilitate the already mentioned flexibility of the connection. In addition, there is also the above-explained advantage that anchor rods having an annular protrusion, projecting on the front end, which can be formed, for example, as a rolling process burr when manufacturing the external thread of the anchor, axially compress the elastic sealing rings and thereby improve the sealing effect. Preferably, each sealing ring forms two sealing zones. One sealing zone is located between the sealing ring and the clamping ring, and the other sealing zone is located between the sealing ring and the front end of the anchor rod at the radially outer end face region thereof. Preferably, it is provided that the outside diameter of the plane-parallel ring surface regions of the clamping ring corresponds at least approximately to the outside diameter of the planar, radially inner end face regions of the anchor rods, and/or that the inside diameter of the plane-parallel inner ring surface regions of the clamping ring is at least approximately equal to or smaller than the inside diameter of the radially inner end face regions of the anchor rods. This enables large contact surfaces for good transmission of impact energy during rotary-percussive drilling. Also, it is preferred that the outside diameter of the radially outer end face region of the anchor rods lies within the radius interval in which the abutment surface of the sealing rings extends in the undeformed state. In addition to axial compression of the sealing rings, screwing in the anchor rods inevitably also results in radial expansion of the sealing rings, so that the sealing rings are sealingly pressed into the recesses of the coupling sleeve.

Furthermore, the invention also comprises an injection drilling anchor, preferably for rotary-percussive drilling, having at least one drill bit screwed onto an anchor rod, the injection drilling anchor comprising one or a plurality of coupling arrangements in which in each case one or more of the above-described features are implemented.

The invention also comprises a method for connecting two support members, preferably two anchor rods of an injection drilling anchor for rotary-percussive drilling, comprising the method steps: providing a coupling, said coupling comprising a sleeve-like coupling sleeve having screw-in openings that extend from two opposite ends and are each provided with an internal thread for screwing in support members, a radially inwardly facing mounting protrusion that preferably extends annularly along the entire periphery being formed between the two internal threads of the screw-in openings on the inner side of the coupling sleeve, a radial recess that is rotationally symmetrical with regard to the geometrical longitudinal center axis of the coupling sleeve being formed in each case between the mounting protrusion and the internal threads, said recess adjoining a preferably conical run-out of the adjacent internal thread or intersecting the internal thread, an elastically deformable sealing ring preferably made of plastics being insertable in each case into the two recesses, in an unloaded state of the sealing ring, the outside diameter thereof being larger than the inside diameter of the mounting protrusion and/or larger than or equal to the core diameter of the internal thread. Based on the prior art explained at the beginning, it is in this respect an object of the invention to advantageously improve such a method, in particular the aim being to simplify the method while achieving a reliable sealing effect and high axial impact stiffness at the same time.

The object is achieved according to the invention first and foremost with the following further method steps: providing a clamping ring preferably made from metal, the outside diameter of which is smaller than or equal to the inside diameter of the mounting protrusion, using or selecting sealing rings, each of which has a rotationally symmetrical abutment surface which, for abutment against one of the two lateral surfaces of the clamping ring, extends in a radius interval that geometrically overlaps a radius interval of the lateral surfaces of the clamping ring when the sealing rings are concentrically aligned with the clamping ring, inserting a first sealing ring into a first recess so that the abutment surface of said first sealing ring faces toward the hollow cross-section enclosed by the mounting protrusion, inserting the clamping ring into the hollow cross-section enclosed by the mounting protrusion, and inserting the second sealing ring into the second recess so that the abutment surface of said second sealing ring faces toward the hollow cross-section or clamping ring enclosed by the mounting protrusion. In terms of possible effects and achievable advantages, reference is made to the preceding description. It is preferred that prior to inserting into the recess, the sealing rings are ovally deformed and are inserted in this shape into the coupling sleeve, where they are pivoted into the run-out of the thread and clipped into the recess.

BRIEF DESCRIPTION OF THE DRAWINGS

The invention is further described below with reference to the accompanying figures, which show a preferred exemplary embodiment. In the figures:

FIG. 6A shows the coupling shown in FIG. 4A with only one anchor rod screwed in.

DETAILED DESCRIPTION OF THE INVENTION

Figure 1A:
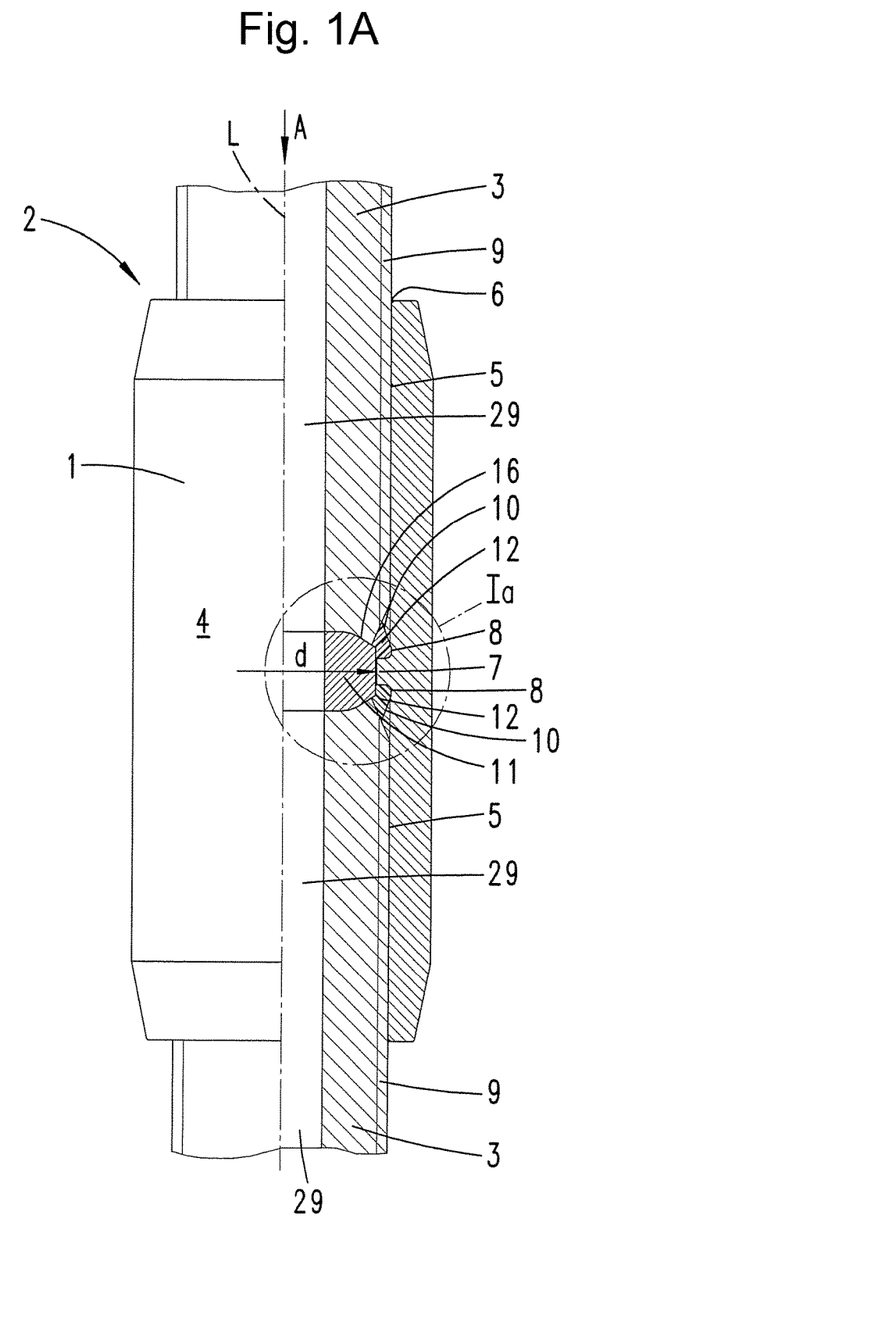
FIG. 1A shows a coupling according to the invention according to a preferred exemplary embodiment in an arrangement with two anchor rods screwed into said coupling, with one side as a longitudinal section and the other side as a longitudinal view.
Figure 1B:
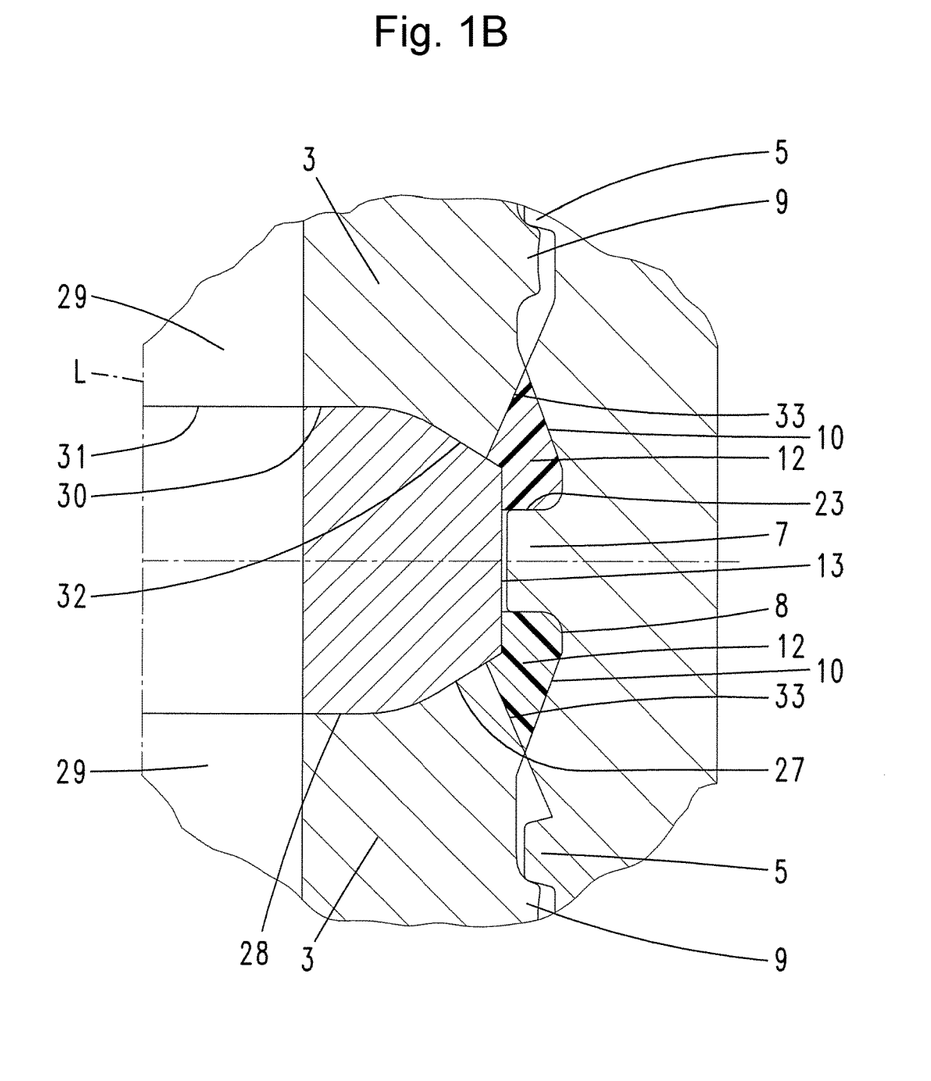
FIG. 1B shows an enlargement of detail la of FIG. 1A.
Figure 2:
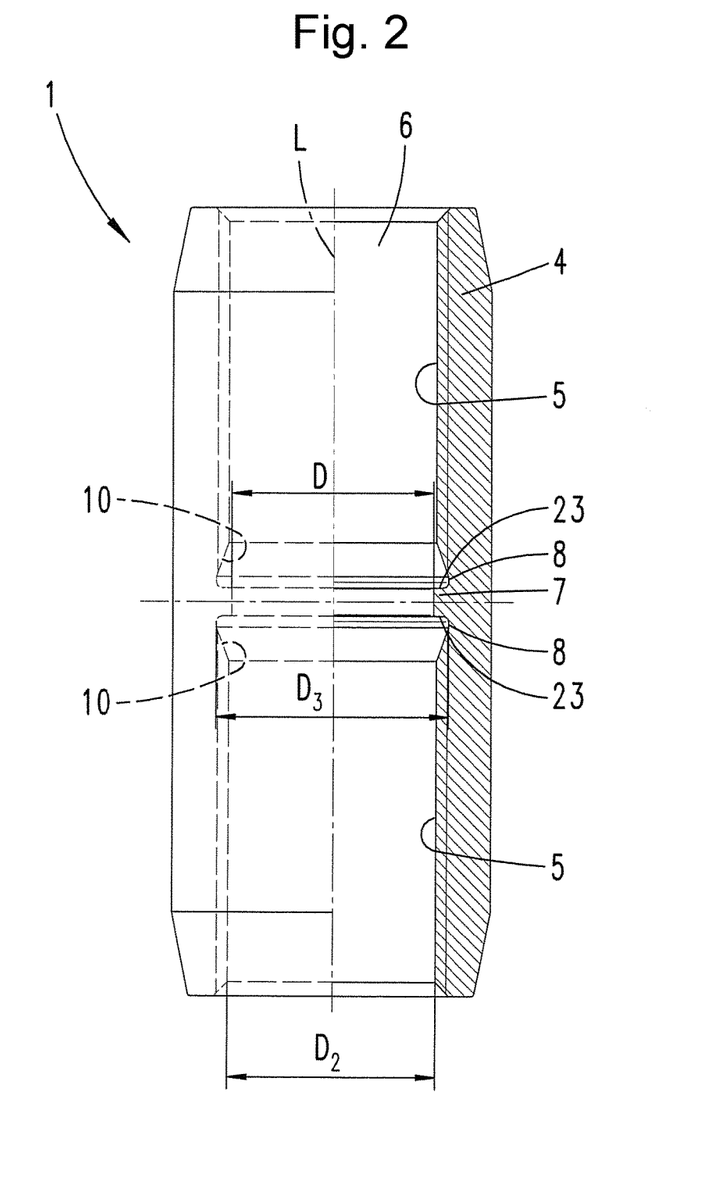
FIG. 2 shows the coupling sleeve shown in FIG. 1A, with one side as a longitudinal section and the other side as a longitudinal view, with occluded edges shown in dashed lines.
Figure 3:
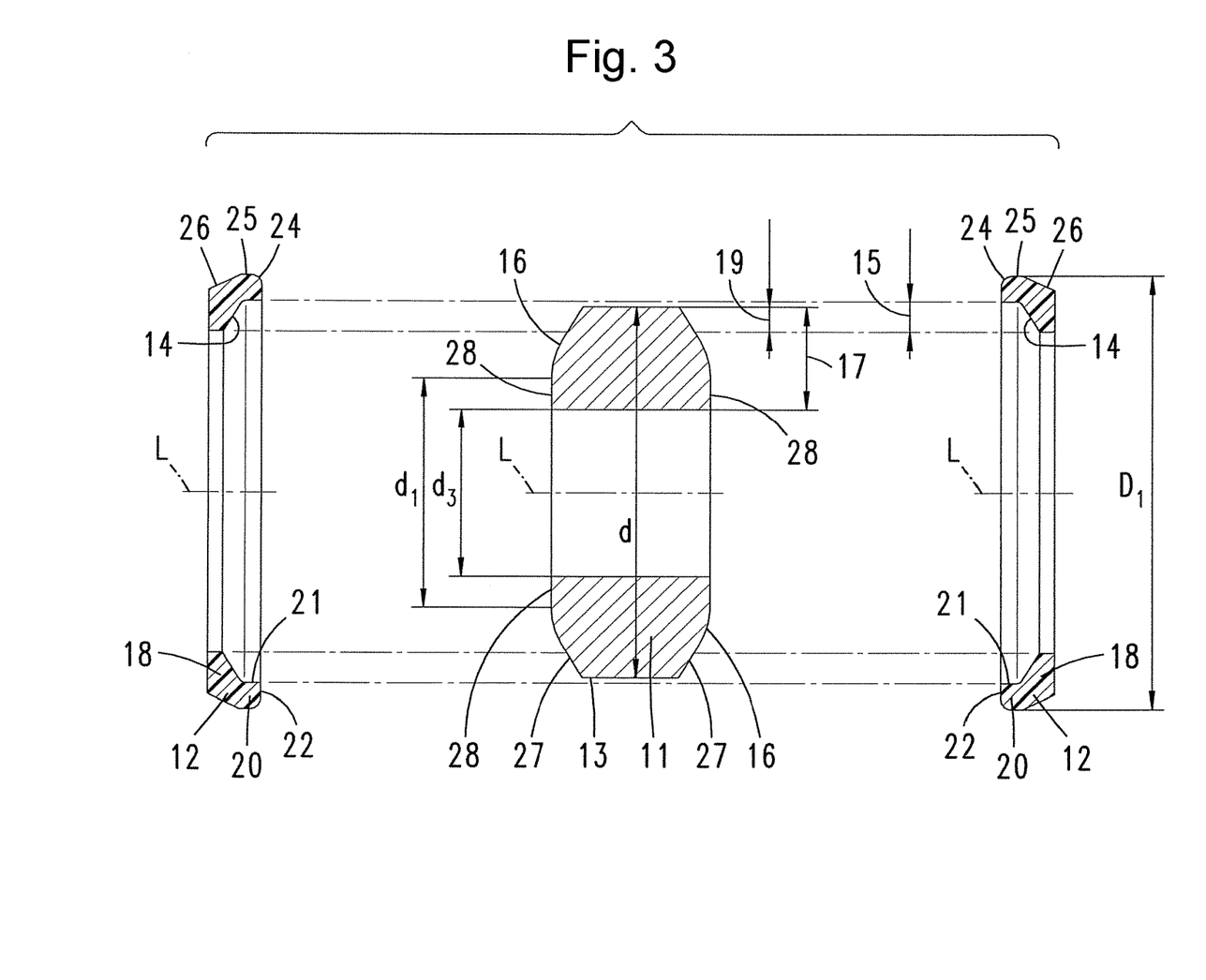
FIG. 3 shows in comparison to FIG. 1A the clamping ring shown therein in an enlarged view, and the two sealing rings shown therein, in each case in a sectional view and moved apart from one another.
Figure 4A:
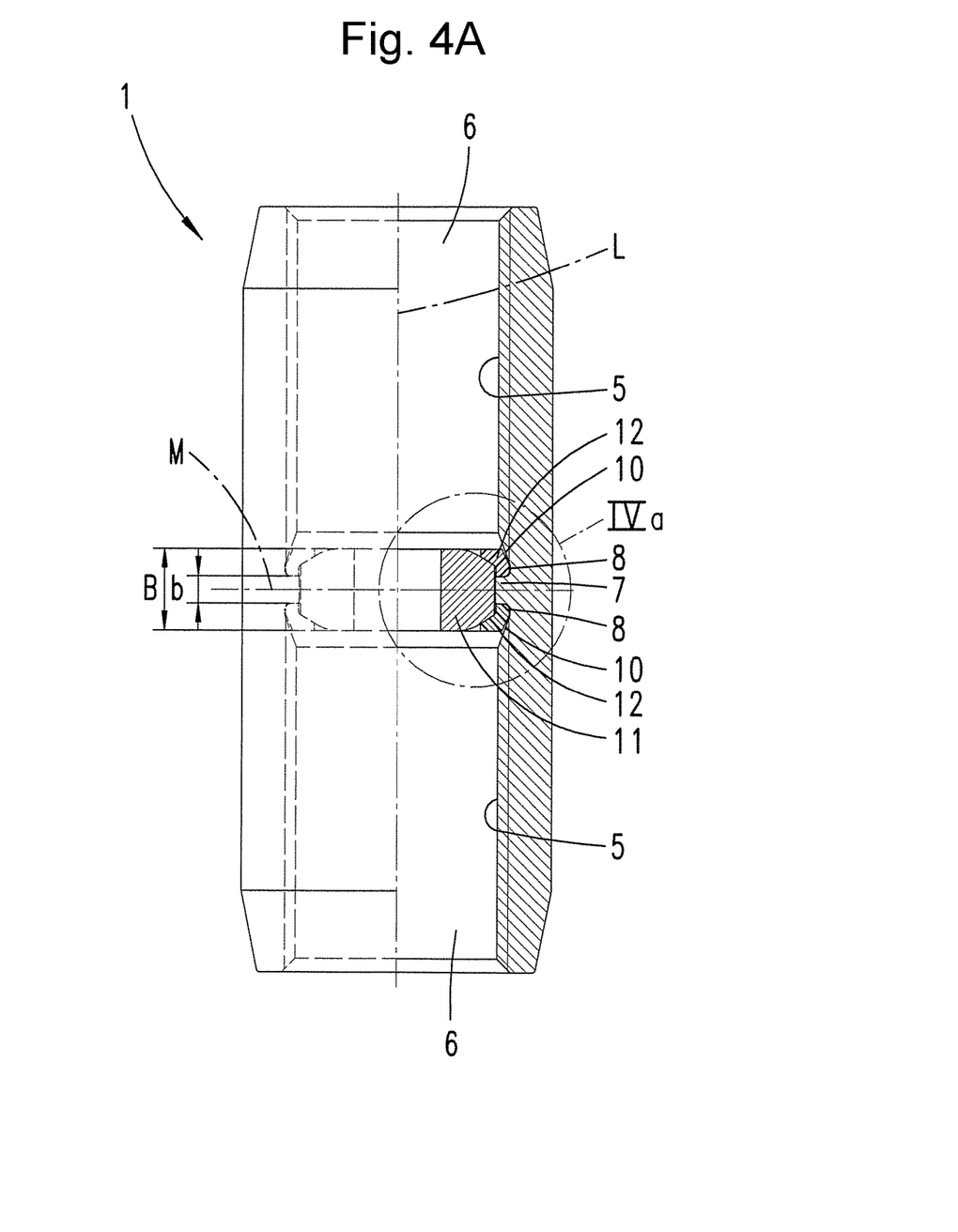
FIG. 4A shows the coupling according to the invention according to FIG. 1A, but without the anchor rod screwed in, with one side as a longitudinal section and the other side as a longitudinal view.
Figure 4B:
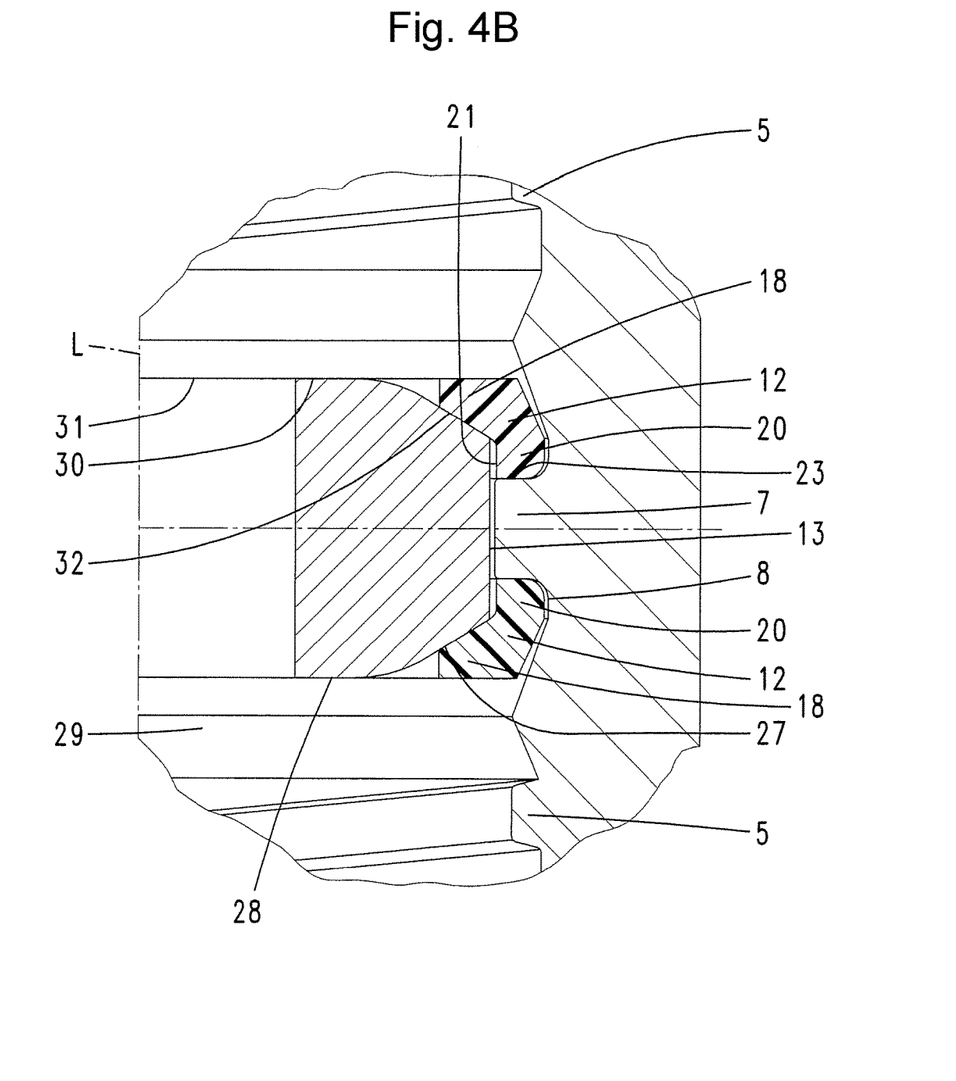
FIG. 4B shows an enlargement of detail IVa according to FIG. 4A.

With reference to the FIGS. 1A to 6B, there is presented a preferred exemplary embodiment of a coupling 1 according to the invention as well as an exemplary use preferred within the scope of the invention for producing a coupling arrangement 2 which comprises such a coupling 1 and two anchor rods 3, for example of an injection drilling anchor, screwed therein for connection. For this, FIGS. 4A, 4B show the coupling 1 in a preassembled state, while FIGS. 2 and 3 show the components of the coupling 1 prior to preassembly. Accordingly, the coupling 1 comprises a sleeve-like coupling sleeve 4 having two screw-in openings 6 that extend from two opposite ends and are each provided with an internal thread 5 for screwing in support members, for example in each case one of the anchor rods 3 shown in FIGS. 5, 5a. Between the two internal threads 5, on the inner side of the coupling sleeve 4, a radially inwardly facing mounting protrusion 7 is formed and extends annularly along the entire periphery. Between the mounting protrusion 7 and the two internal threads 5, in each case adjacent to the mounting protrusion 7, there is in each case a radial recess 8 that is rotationally symmetrical with regard to the geometrical longitudinal center axis L. Said recess adjoins the mounting protrusion 7 on one side, and in the direction of the longitudinal center axis L, i.e. on its axially opposite side, adjoins a conical run-out 10 of the adjacent internal thread 5. The coupling 1 further comprises a clamping ring 11 and two identical sealing rings 12. Since the clamping ring 11 and the sealing rings 12 are rotationally symmetrical, the sectional view through the center selected in FIG. 3 is in each case sufficient for the illustration thereof. The illustration of the preassembled state of the coupling 1 according to FIGS. 4, 4a shows that the width B of the clamping ring 11 in the example is approximately three times the width b of the mounting protrusion 7. In its middle portion with reference to the longitudinal center axis L, the clamping ring 11 has a cylindrical outer surface 13, the outside diameter d of which in the example is selected to be slightly smaller than the inside diameter D of the mounting protrusion 7. Furthermore, the outside diameter $D_1$ of the two sealing rings 12 in the undeformed state shown in FIG. 3 is larger than the inside diameter d of the mounting protrusion 7 and, in the example, is larger than the core diameter $D_2$ of the internal thread 5. In order to get from the dismantled state of the coupling 1 shown in the FIGS. 2, 3 to the preassembled state of use shown in FIGS. 4A, 4B, in first instance, one of the two sealing rings 1 made from elastically deformable plastics has been deformed, starting from its unloaded circular form, between two fingers into an oval form by means of compressive force, and led through one of the two screw-in openings 6 of the coupling sleeve 4 into the hollow interior thereof, has been tilted there into a cross-section perpendicular to the longitudinal center axis L, and in the course of the elastic recovery has been clipped into the recess 8 located there. Subsequently, the clamping ring 11 has been inserted through the oppositely situated screw-in opening 6 and into the coupling sleeve 4 approximately up to the position shown in FIG. 4A, in which the hollow cross-section or ring cross-section spanned by the clamping ring 11 lies perpendicularly with respect to the longitudinal center axis L, and in which the clamping ring 11 is positioned in the direction of the longitudinal center axis L, approximately midway, symmetrically with respect to the mounting protrusion 7 and, starting from a geometrical middle line M, extends on both sides into the region of the run-outs 10 of the internal threads 5. Subsequently, the remaining sealing ring 12 has been inserted in a corresponding manner through said oppositely situated screw-in opening 6 and into the coupling sleeve 4, and clipped therein into the recess 8 remaining for said sealing ring. As a result of the described diameter relationships, the two sealing rings 12 are accommodated on both sides in the direction of the longitudinal center axis L in an axially captive manner by the formed positive-locking fit. The two sealing rings 12 each have a rotationally symmetrical abutment surface 14 (cf. FIG. 3) which, for abutment against one of the two lateral surfaces 16 of the clamping ring 11, extends in a radius interval 15 which partially geometrically overlaps a radius interval 17 of the lateral surfaces 16 of the clamping ring 11 (cf. FIG. 3) when the sealing rings 12, as shown, are concentrically aligned with the clamping ring 11. In the preassembled state in FIGS. 4A, 4B, this causes the clamping ring 11 to be also captively held in the coupling sleeve 4 between the two sealing rings 12 in the axial direction, i.e. the direction of the longitudinal center axis L, even though the clamping ring is accommodated in the hollow cross-section of the mounting protrusion 7 with a slight clearance for movement. The largest diameter $D_3$ of the recess 8 corresponds substantially to the outside diameter $D_1$ of the sealing rings 12, so that they are substantially held in the coupling sleeve 4 without radial clearance for movement. On the other hand, the shape and size selected in the example for the profile cross-section of the sealing rings 12 shown in FIG. 3, in conjunction with the axial extent of the recess 8 and the run-outs 10 of the internal threads 5, lead to the fact that in the preassembled state, the two sealing rings 12 still have a limited clearance for movement in the direction of the longitudinal center axis L, i.e. in the axial direction, whereby in particular clipping in is made easier. According to the profile cross-section of the sealing rings 12 shown in FIG. 3 (and, e.g., in FIG. 4B), the sealing rings each have a radially inner ring portion 18 which, on its side facing toward the mounting protrusion and/or the clamping ring 11, is bordered by said abutment surface 14. FIG. 3 illustrates as a radial overlapping interval 19 the overlapping region between the radius intervals 15 and 17. In the overlapping interval 19 in the example, the abutment surface 14 of the sealing rings 12 and the lateral surfaces 16 of the clamping ring 11 are each implemented conically with inclinations or slopes that correlate in terms of magnitude so that these corresponding shapes result in a face-to-face surface support. The two sealing rings 12 each have a radially outer ring portion 20 that is connected to the inner ring portion 18 and is bordered by a cylindrical inner surface 21 that transitions with a bend into the abutment surface 14. On the outer ring portion 20, the inner surface 21 adjoins an end lateral surface 22 for support on an end lateral surface 23 of the mounting protrusion 7, the lateral surfaces 22, 23 of the outer ring portion 20 and the mounting protrusion 7 in the profile cross-sections shown in the FIGS. 2, 3 each extending perpendicularly with respect to the geometrical longitudinal center axis L so that a face-to-face surface support is possible. On the outer ring portion 20, the end lateral surface 22 transitions with a curve 24 into a short cylindrical outer surface 25, the outer surface 25 and the curve 24, on the one hand, and also that surface of the recess 8 that adjoins the lateral surface 23 of the mounting protrusion 7, likewise having corresponding cross-sectional profiles for achieving a continuous face-to-face surface support. On the outer ring portion 20, the outer surface 25 transitions in its further course into a back surface 26 that is inclined with respect to said outer surface and extends conically with regard to the geometrical longitudinal center axis L. Here, in the cross-section oriented transversely with respect to the circumferential direction shown in FIGS. 2, 3, the back surface 26 is inclined more sharply toward the geometrical longitudinal center axis L than the conical run-out 10 of the internal threads 5, resulting in back clearance that increases toward the sides.

FIG. 3 additionally shows that the oppositely situated end lateral surfaces 16 of the clamping ring 11 extend conically in a respective radially outer ring surface region 27 and transition in a rounded manner into a radially inner ring surface region 28 that extends straight and perpendicular to the geometrical longitudinal center axis L. It is also provided that the outer ring surface region 27 extends radially inwardly beyond the radius interval 15 of the abutment surface 14 of the sealing ring 12.

Figure 5A:
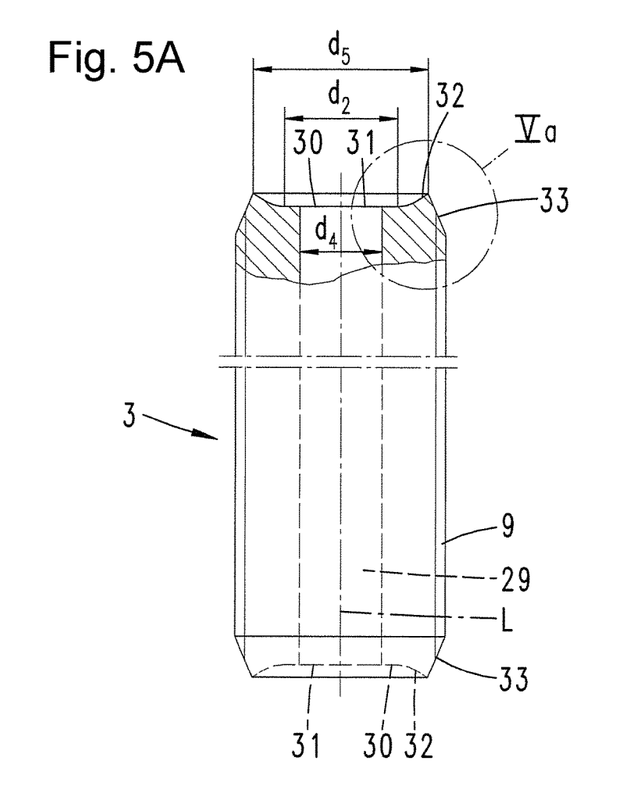
FIG. 5A shows an anchor rod of an injection drilling anchor suitable for using the coupling according to the invention, according to a preferred embodiment, illustrated in shortened form and partially cut open.
Figure 5B:
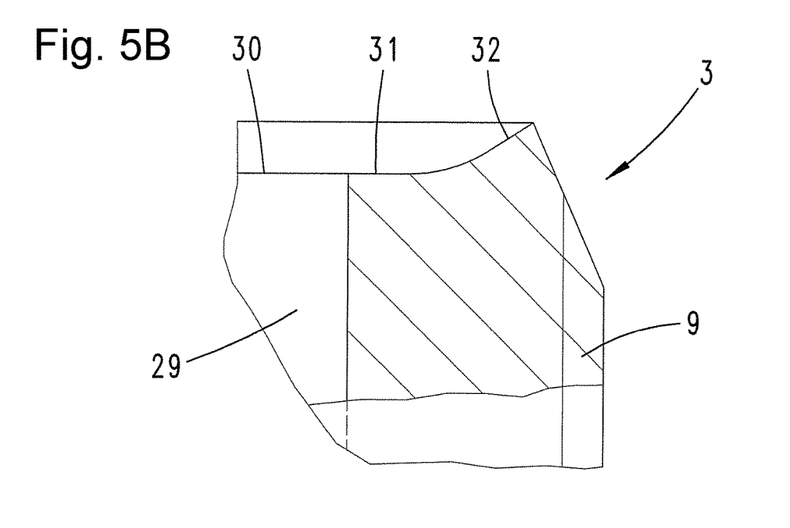
FIG. 5B shows an enlargement of detail Va according to FIG. 5A.
Figure 6A:
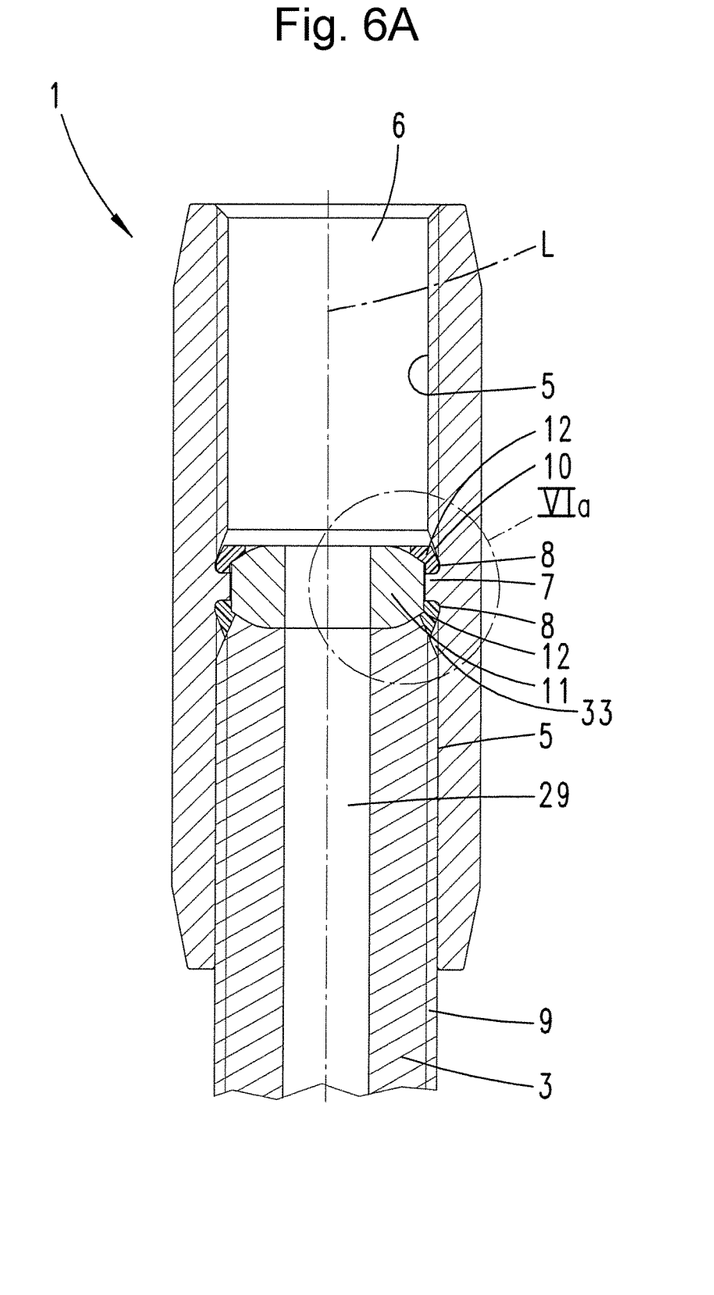
Figure 6B:
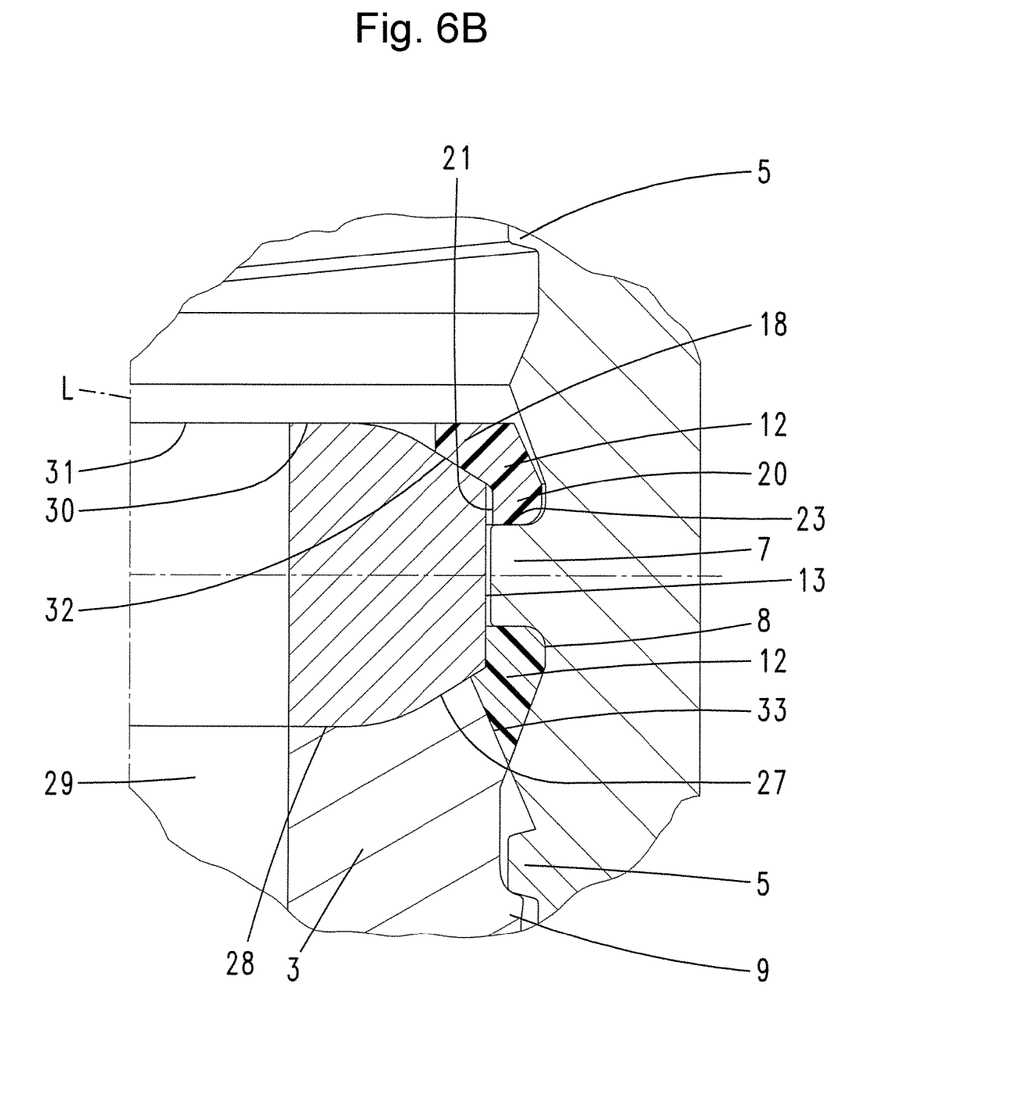
FIG. 6B shows an enlargement of detail Via of FIG. 6A.

Based on the preassembled state of use shown in FIGS. 4A, 4B, the coupling 1 according to the invention can be used for connecting two support members, for example two of the anchor rods 3 shown in FIGS. 5A, 5B. Such anchor rods 3, which are known per se, have a center channel 29 that passes through along the geometrical longitudinal center axis L of the anchor rods and extends between the two ends. In the region of these ends, and in the selected example likewise continuous, the outer circumferential surface carries an external thread 9, which can be, for example, a coarse thread that is rolled on. The internal thread 5 of the coupling sleeve 4 is matched to the external thread 9 for establishing a screw connection. FIGS. 5A, 5B show that the end faces 30 of the anchor rods 3 each have a radially inner, planar end face region 31 that is perpendicular to the geometrical longitudinal center axis L, and radially outward thereof, an end face region 32 that, in the direction of the longitudinal center axis L of the anchor rod 3, protrudes beyond the inner planar end face region 31 to an increasing extent in the radially outward direction. A comparison of FIGS. 3 and 5A, and also FIGS. 1A, 1B and 6A, 6B shows that the radially outer end face region 32 of the anchor rod 3 and the radially outer ring surface portion 27 of the clamping ring 11 in the profile cross-section extend in each case with the same inclination with regard to the geometrical longitudinal axis L of the coupling 1. Therefore, their shape is matched to one another in such a manner that screwing in the anchor rods 3 into the coupling 1 results in a face-to-face surface support of the radially outer end face regions 32 on the radially outer ring surface region 27 of the clamping ring 11. It is provided here that the outside diameter $d_1$ of the plane-parallel inner ring surface regions 28 of the clamping ring 11 corresponds to the outside diameter $d_2$ of the planar, radial inner end face regions 31 of the anchor rods 3, and that the inside diameter $d_3$ of the plane-parallel inner ring surface regions 28 of the clamping ring 22 is equal to the inside diameter $d_4$ of the radially inner end face regions 31 of the anchor rods 3. The outside diameter $d_5$ of the axially projecting outer end face region 32 of the anchor rods 3, at which the axial projection is at a maximum, lies within the radius interval 15 in which the abutment surface 14 of the sealing rings 12 extends in the undeformed state of said sealing rings.

Starting from the preassembled state of use according to FIGS. 4A, 4B, FIGS. 6A, 6B show an intermediate step which in further course leads to the production and/or assembly of the coupling arrangement 2 shown in FIGS. 1A, 1B. For this purpose, an anchor rod 3 has been screwed into the preassembled coupling 1 initially only in one screw-in opening 6 thereof until the end face 30 of the anchor rod rests against the lateral surface 16 of the clamping ring 11. As a result of the described diameter relationships, the end face 30 rests face-to-face with its inner end face region 31 and also with its axially projecting end face region 32 located radially outward thereof against the correspondingly formed ring surface regions 28 and 27 of the lateral surface 16 of the clamping ring 11. At the longitudinal ends, radially outside of the end face regions 32, the anchor rod 3 has a chamfer 33. When screwing in the anchor rod 3, said chamfer pushes axially and from radially inwardly against the radially inner ring portion 18 of the sealing ring 12 so that the latter becomes radially flared and pressed into the recess 8. The first anchor rod 3 is preferably initially screwed into the coupling sleeve 4 until the sealing ring 12 supported on the mounting protrusion 7 permits no further deformation at the selected screw-in force. This corresponds to the intermediate step shown in FIGS. 6A, 6B. In order to get to the coupling arrangement 2 shown in FIGS. 1A, 1B, a further, preferably a corresponding, anchor rod 3 is screwed into the remaining screw-in opening 6, thereby also deforming the sealing ring 12 situated therein. The figures show that the two anchor rods 3 now support one another by means of the clamping ring 11 likewise made of steel, and can be braced against one another with any desired strength or force by means of the two internal threads 5. The sealing rings 12 lie outside of the axial flow of forces which, for example when applying an axial impact force designated by reference character A in FIG. 1A, passes from an anchor rod 3 directly through the clamping ring 11 to the adjacent anchor rod 3. If needed, the coupling arrangement shown in FIG. 1A, 1B can be supplemented by additional anchor rods 3 and couplings 1. Also, it will be apparent to the person skilled in the art that such an arrangement of couplings 1 and anchor rods 3 can be completed to form an injection drilling anchor by screwing a drill bit known per se (not illustrated in the figures) provided, e.g., with a matching internal thread, onto a free longitudinal end of the most forward anchor rod 3. At the longitudinal end of the injection drilling anchor, which end is located opposite from the drill bit when viewed in the direction of the geometrical longitudinal center axis L, for example, a drill drive likewise provided with a matching internal thread can be connected, and, by means of the drill drive, a torque, and, if necessary, additional pulsating axial force or impact energy can be transmitted to the injection drilling anchor in order to introduce the latter into the bedrock.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application. The subsidiary claims in their optional subordinated formulation characterize independent inventive refinement of the prior art, in particular to undertake divisional applications based on these claims.

What is claimed is:

1. A coupling arrangement, comprising:
   two anchor rods, each having a continuous center channel and a continuous external thread in a longitudinal direction thereof;
   a coupling configured to connect the two anchor rods, the coupling including:
      a sleeve-like coupling sleeve having two screw-in openings that extend from two opposite ends and are each provided with an internal thread configured to permit screwing in of one of the two anchor rods;
      a mounting protrusion that faces radially inward and extends annularly along an entire periphery formed between the respective internal threads of the two screw-in openings of the coupling sleeve;
      two recesses, each extending radially and rotationally symmetrical with regard to a geometrical longitudinal center axis of the coupling sleeve formed between the mounting protrusion and the respective internal threads of the two screw-in openings, the two recesses each adjoining or intersecting the respective internal thread adjacent thereto;
      two sealing rings, each being a discrete component that is elastically deformable and each sealing ring is inserted or insertable into one of the two recesses respectively; and
      in an unloaded state of the two sealing rings respective outside diameters thereof being larger than an inside diameter of the mounting protrusion and/or larger than respective core diameters of the respective internal threads of the two screw-in openings;
      a clamping ring made of metal and having an outside diameter which is smaller than or equal to the inside diameter of the mounting protrusion; and
   wherein each of the two sealing rings has a rotationally symmetrical abutment surface configured to abut against one of two lateral surfaces of the clamping ring, and which partially radially overlaps the respective lateral surface of the clamping ring when the sealing ring is concentrically aligned with the clamping ring; and wherein each of the two anchor rods is configured to be screwed into one of the two screw-in openings of the coupling sleeve until an end face of the anchor rod is supported on one of the two lateral surfaces of the clamping ring.

2. The coupling arrangement of claim 1, wherein the clamping ring is a separate component from the coupling sleeve.

3. The coupling arrangement of claim 1, wherein the clamping ring is fixedly secured to the mounting protrusion.

4. The coupling arrangement of claim 1, wherein in the unloaded state, each of the two sealing rings is inserted into one of the two recesses and positively held along an entire periphery or at least in certain peripheral regions in the respective recess without clearance for movement in a direction parallel to the geometrical longitudinal center axis.

5. The coupling arrangement of claim 1, wherein each of the two sealing rings has a radially inner ring portion that is bordered on one side by the abutment surface thereof.

6. The coupling arrangement of claim 1, wherein at least in radial overlapping areas, the respective abutment surfaces of the two sealing rings and the respective lateral surfaces of the clamping ring have shapes that are matched to one another for achieving a face-to-face surface support and that are conical and/or rounded in profile cross-section, at least in certain regions.

7. The coupling arrangement of claim 1, wherein the two sealing rings each have a radially outer ring portion that is connected to a radially inner ring portion and that is bordered by a cylindrical or substantially cylindrical inner surface that transitions into the respective abutment surface in an inclined or rounded manner.

8. The coupling arrangement of claim 7, wherein on the radially outer ring portion of each of the two sealing rings, the inner surface adjoins an end lateral surface for support on an end lateral surface of the mounting protrusion; and wherein the respective end lateral surfaces of the radially outer ring portions of the two sealing rings and respective end lateral surfaces of the mounting protrusion have shapes that are matched to one another for achieving a planar surface support, and extend in a radial direction transversely with respect to the geometrical longitudinal center axis.

9. The coupling arrangement of claim 7, wherein on the radially outer ring portion of each of the two sealing rings, the end lateral surface transitions with a curve into an outer surface of the radially outer ring portion, the curve adjoining the outer surface, as well as a circumferential surface of the respective recess, which circumferential surface adjoins the end lateral surface of the mounting protrusion, having shapes that are matched to one another for achieving a continuous face-to-face surface support.

10. The coupling arrangement of claim 7, wherein on the radially outer ring portion of each of the two sealing rings, the outer surface transitions into a back surface inclined thereto, and the back surface, in a cross-section oriented transversely with respect to a circumferential direction, extends with a sharper incline relative to the geometrical longitudinal center axis than a conical run-out of the respective internal thread.

11. The coupling arrangement of claim 1, wherein in a preassembled state of the coupling in which the two sealing rings are inserted into the respective recesses and the clamping ring is situated between the two sealing rings, the clamping ring, in the direction parallel to the geometrical longitudinal center axis, is held relative to the coupling sleeve with only little clearance for movement or without clearance for movement.

12. The coupling arrangement of claim 1, wherein in a preassembled state of the coupling in which the two sealing rings are inserted in the respective recesses and the clamping ring is situated between the two sealing rings, the two sealing rings, in the direction of the geometrical longitudinal center axis, are substantially flush with the two lateral surfaces of the clamping ring or protrude beyond them.

13. The coupling arrangement of claim 1, wherein the inside diameter of the mounting protrusion is smaller than or approximately equal to the respective core diameter of the respective internal thread.

14. The coupling arrangement of claim 1, wherein the two lateral surfaces of the clamping ring run conically and/or with a convex curvature in a radially outer ring surface region, and in a radially inner ring surface region, run perpendicularly with respect to the geometrical longitudinal center axis and plane-parallel to one another, the radially outer ring surface region transitioning into the radially inner ring surface region in a curved manner.

15. The coupling to arrangement of claim 14, wherein the radially outer ring surface region extends radially inwardly beyond the abutment surface of an inner ring portion of each of the two sealing rings.

16. The coupling arrangement of claim 14, wherein the end face of each of the two anchor rods has a radially inner planar end face region, and radially outward thereof, an end face region that, in the direction of the geometrical longitudinal center axis of the respective anchor rod, protrudes beyond the inner planar end face region to an increasing extent in a radially outward direction, and that the radially outer end face region of the respective anchor rod and the radially outer ring surface region of the clamping ring have shapes that are conical and/or curved in profile cross-section and are matched to one another for achieving, at least in a limited radius interval, a face-to-face surface support.

17. The coupling arrangement of claim 1, wherein an outside diameter of a plane-parallel ring surface region of the clamping ring corresponds at least approximately to respective outside diameters of planar, radially inner end face regions of the two anchor rods, and/or an inside diameter of the plane-parallel inner ring surface region of the clamping ring is at least approximately equal to or smaller than respective inside diameters of the radially inner end face regions of the two anchor rods.

18. The coupling arrangement of claim 1, wherein respective outside diameters of radially outer end face regions of the two anchor rods lie within radially overlapping areas in which the respective abutment surfaces of the two sealing rings extend in the undeformed state thereof.

19. The coupling arrangement of claim 1, wherein each of the two recesses adjoins a conical run-out of the respective internal thread adjacent thereto, and/or each of the two sealing rings are made of a plastic material.

* * * * *